(12) United States Patent
Tichy et al.

(10) Patent No.: US 7,809,774 B2
(45) Date of Patent: Oct. 5, 2010

(54) DISTRIBUTED FILE SYSTEM AND METHOD OF OPERATING A DISTRIBUTED FILE SYSTEM

(75) Inventors: Walter Tichy, Karlsruhe (DE); Florin Isaila, Karlsruhe (DE)

(73) Assignee: Partec Cluster Competence Center GmbH, Munich (DE)

( * ) Notice: Subject to any disclaimer, the term of this patent is extended or adjusted under 35 U.S.C. 154(b) by 1366 days.

(21) Appl. No.: 10/491,459

(22) PCT Filed: Oct. 1, 2002
(Under 37 CFR 1.47)

(86) PCT No.: PCT/EP02/11021
§ 371 (c)(1),
(2), (4) Date: Jul. 8, 2005

(87) PCT Pub. No.: WO03/030022
PCT Pub. Date: Apr. 10, 2003

(65) Prior Publication Data
US 2006/0101025 A1    May 11, 2006

(30) Foreign Application Priority Data
Oct. 1, 2001    (EP) .................................. 01122698

(51) Int. Cl.
*G06F 12/00* (2006.01)
*G06F 17/30* (2006.01)
(52) U.S. Cl. ........................................ 707/822; 707/827
(58) Field of Classification Search .................. 707/100, 707/2, 205, 10, 8; 709/238; 395/650
See application file for complete search history.

(56) References Cited

U.S. PATENT DOCUMENTS 5,325,526 A * 6/1994 Cameron et al. ............ 718/102

OTHER PUBLICATIONS

Peter F. Corbett and Drop G. Feileson, 'The Vesta Parallel File System' Aug. 1996, vol. 14, No. 3, pp. 225-264.*
Corbett et al. "Overview of the Vesta Parallel File System." Computer Architecture News 21(5): 7-14, Dec. 1, 1993.
Corbett al al. "Parallel File Systems for the IBM SP Computers." IBM Systems Journal 34(2): 222-248, Mar. 21, 1995.
Ligon et al. "Implementation and Performance of a Parallel File System for High Performance Distributed Applications." Proceedings of the International Symposium of High Performance Distributed Computing, pp. 471-480, Aug. 1996.

(Continued)

*Primary Examiner*—Charles Rones
*Assistant Examiner*—Fariborz Khoshnoodi
(74) *Attorney, Agent, or Firm*—Kenyon & Kenyon LLP

(57) ABSTRACT

A distributed file system including a plurality of compute nodes and a plurality of input/output (I/O) nodes connected by an interconnection network wherein the system is adapted to use a common data representation for both physical and logical partitions of a file stored in the system and wherein the partitions are linearly addressable. Also provided is a method of operating a distributed file system including a plurality of input/output (I/O) nodes and a plurality of compute nodes, the method including partitioning a file into a plurality of subfiles distributed across a plurality of I/O nodes; logically partitioning a file by setting a view on it, computing mappings between a linear space of a file and a linear space of a subfile, computing the intersection between a view and a subfile, and performing data operations.

9 Claims, 9 Drawing Sheets

OTHER PUBLICATIONS

Nieuwejaar et al. "File Access Characteristics of Parallel Scientific Workloads." IEEE Transactions on Parallel and Distributed Systems 7(10): 1075-1980, Oct. 1996.

Ramaswamy et al. "Automatic Generation of Efficient Array Redistribution Routines for Distributed Memory Multicomputers." Proceedings of Frontiers '95: the Fifth Symposium on the Frontiers of massively Parallel Computation, pp. 342-349, Feb. 1995.

Simitici et al. "A Comparison of Logical and Physical Parallel I/O Patterns." International Journal of High Performance Computing Applications, 12(3): 364-380, 1998.

Smirni et al. "Workload Characterization of I/O Intensive Parallel Applications." Proceedings of the Conference on Modeling Techniques and Tools for Computer Performance Evaluation, Springer-Verlag Lecture Notes in Computer Science, pp. 169-180, Jun. 1997.

* cited by examiner (a) Array form  (b) Tree form a)    b)

(a) Round-robin layout (b) Block-cyclic layout a)            b)

(a) Physical partitioning of a file in subfiles (b) Logical partitioning of a file in views (c) Direct mapping between logical and physical partitioning (d) View and subfile mapping (a) Example 1

(b) Example 2

(a) Logical and physical partitioning(array form)

(b) Logical and physical partitioning(file form)

(c) Projection of $V \cap S$ the view defined by $V$ (d) Projection of $V \cap S$ on $S$ the subfile defined by $S$ (a) Compute node maps $m$ and $M$ on the subfile (b) Communication between compute node and I/O node b                    c                    r

DISTRIBUTED FILE SYSTEM AND METHOD OF OPERATING A DISTRIBUTED FILE SYSTEM

FIELD OF THE INVENTION

The present intervention relates to a method for providing a distributed file system for a cluster of computers and an apparatus providing such a file system.

BACKGROUND INFORMATION

The tremendous increase in the processor speed of computer processors has exposed the Input/Output (I/O) subsystem as a bottleneck in clusters of computers. This affects especially the performance of applications which demand a large amount of data to be brought from disk storage into memory. Therefore it is important that the I/O operations execute as fast as possible in order to minimize their impact on performance.

Distributed file systems (DFS) are file systems which manage the storage capacity of several computing nodes connected by a networking technology and offer to clients a file system interface. The nodes in a cluster are divided into two sets, which may or may not overlap: compute nodes and I/O nodes. Files are typically spread over the I/O nodes. Applications run on the compute nodes.

Parallel applications access the files in a different manner than the sequential ones do. UNIX file systems and even some distributed file systems were designed based on the premise that file sharing is seldom, whereas parallel applications usually access a file concurrently. This means that the file structure of a parallel file system must not only allow parallel access on the file, but must also be scalable, as scalable as the computation, if possible.

Parallel applications also have a wide range of I/O access patterns. At the same time they don't have a sufficient degree of control over the file data placement on a cluster. Therefore, they often access the files in patterns, which differ from the file physical layout on the cluster. This can hurt performance in several ways.

Firstly, poor layout can cause fragmentation of data on the disks of the I/O nodes and complex index computations of accesses are needed. Secondly, the fragmentation of data results in sending lots of small messages over the network instead of a few large ones. Message aggregation is possible, but the costs for gathering and scattering are not negligible. Thirdly, the contention of related processes at I/O nodes can lead to overload and can hinder the parallelism. Fourthly, poor spacial locality of data on the disks of the I/O nodes translates in disk access other than sequential. Poor layout also increases the probability of false sharing within the file blocks.

A particular file layout may improve the performance of the parallel applications but the same layout has to be used by different access patterns. Computing the mapping between an arbitrary access pattern and the file layout may become tricky.

There exist several studies of parallel I/O access patterns and file access characteristics. In particular, the following are relevant for the understanding of the present invention:

Nils Nieuwejaar, David Kotz, Apratim Purakayastha, Carla Schlatter Ellis, Michael L. Best, "File Access Characteristics of Parallel Scientific Workloads", IEEE Transactions on Parallel and Distributed Systems, 7(10), October 1996 (Nieuwejaar et al.);

Evgenia Smirni and Daniel A. Reed, "Workload Characterization of I/O Intensive Parallel Applications" Proceedings of the Conference on Modelling Techniques and Tools for Computer Performance Evaluation, Springer-Verlag Lecture Notes in Computer Science, June 1997 (Smirni et al.); and Huseyin Simitici and Daniel A. Reed, "A Comparison of Logical and Physical Parallel I/O Patterns" International Journal of High Performance Computing Applications, special issue (I/O in Parallel Applications), 12(3), 1998 (Simitici et al.).

From the above indicated documents, it can be concluded that file sharing among several processors in a single application is the norm, while concurrent sharing between parallel applications is rare; parallel I/O is bursty, periods of intensive I/O activity alternating with computation; in MIMD systems there was a high number of small I/O requests which to some extent is the result of the logical partitioning of data among the processors in patterns different than the physical partitioning in the files; the compute nodes frequently access a file in inter-leaved access patterns and this may result in high inter-process spatial locality of data at I/O nodes but also in a poor intra-process spatial locality; and parallel applications use strided access pattern eventually nested strided, indicating the use of multi-dimensional arrays, partitioned across the compute nodes.

Usually the central part of a distributed file system implementation is the file server. A file server is a process, which manages a pool of storage resources and offers a file service to remote or local clients. A file service is an interface though which the clients request services (e.g. read, write, seek) to a file server.

One of the design goals of distributed file systems is to efficiently use the storage resources network-wide. Due to their slow access times disks are very often system bottlenecks. A system called a Redundant Arrays of Inexpensive Disks (RAID) is one method of scalable increasing the disk bandwidth by accessing them in parallel: data is spread over the available disks redundantly, redundancy is used for recovery and availability if one of the disks fails. A distributed file system can be implemented as a software RAID to take advantage of all the disks available in a high performance network.

One of the major goals of a distributed file system implementation is location transparency. This means that the interaction between client and server must be invisible for the users of the system. The users should see all the storage resources in the system and their abstractions (files) as if they would be local. Looking at the path of a file, one should not be able to tell if the file is remote or local.

Unfortunately hiding the locality doesn't hide the difference between local and remote access times. In order to mitigate this problem two techniques are widely used: caching and pre-fetching.

In the one-machine systems caching is used to improve local disk access times, providing copies of the low-speed disks in the faster memory. Supplementary distributed file system caches have the role of providing local copies of remote resources. Caching improves the performance of the applications which exhibit temporal locality of access, i.e. in a program, once a block has been accessed, it is highly probable that it will be accessed again in the near future. Performance measurements show that this is the case with most applications.

In distributed file system, if we assume the most frequent client-server design, several caching levels of the server disks can be identified from the perspective of a client:

client memory cache server memory cache other clients' memory caches
client disk cache If a high performance network is used, under the conditions of the actual technologies, the access time will increase from the first to the fourth-aforementioned caching levels.

The caching levels can be used independently from each other or in cooperation. Cooperative caching allows requests not satisfied by the local cache (first level) to be satisfied by another caching level and only lastly by the original resource.

In the case of reading access the only limitation of caching is the size of the caches. In turn when a cache is written, additional care must be taken to ensure cache coherency, i.e. if a process writes to any cache location a subsequent read of any process must see that modification.

The above definition is exactly what Unix semantics guarantees. This is easy to implement in the one-machine systems, because they usually have a centralized file system cache which is shared between processes. In the distributed file system, several caching entities can contain the very same copy, and the modification of one copy must trigger either an update or an invalidation of the others, which incurs a considerable overhead. An alternative to this approach, which eliminates the need for a coherency protocol, is to consider all caches in the distributed system as a single large cache and not to allow replication. However the drawback of this approach is that it would reduce access locality.

In order to reduce the overhead of a Unix semantics implementation, relaxed semantics have been proposed. In the session semantics all the modifications made by a process to a file after opening, will be made visible to the other processes only after the process closes the file. The same idea but at a smaller granularity was used in the database file systems: all the modifications made between control instructions begin-transaction and end-transaction will be visible to the other processes only after execution of the last instruction finishes.

Pre-fetching means reading ahead from disk into cache data blocks very probable to be accessed in the near future. The applications with predictable access patterns can mostly benefit from pre-fetching.

In a distributed file system parallel pre-fetching can be employed to read ahead in parallel from the available disks. For instance a software RAID can use the disks in a network in a balanced way. Aggressive pre-fetching can be used to bring the data into caches very early, but this can lead to bad cache replacement choices, which may actually increase the number of accesses. To put it in another way, data being pre-fetched too early increases the chance that blocks, which are still needed, are evicted from the cache and if the data is fetched too late, the accessing process must wait for I/O to complete. Several algorithms have been proposed for finding the optimal trade-off between caching and pre-fetching policies. Unfortunately because of the lack of cooperation between caches in the distributed file system they have not been widely implemented and tested yet.

The design of the log-structured file systems was guided by two major assumptions: the caches absorb most of the reads and the disk traffic is dominated by small writes. As a consequence a large time of disk time was spent seeking for the right sector. Log-structured file systems addressed these two major issues by gathering all the writes in a memory segment called log and writing it to disk in a single operation when it became full. This approach improved the average disk time with one order of magnitude for small writes.

Log-structured file system used a check-pointing strategy for recovery. In case of failure the last checkpoint is loaded and the available log is played.

Distributed file systems took over this idea and implemented it efficiently in combination with a software RAID. A protocol for a network file system, known as NFS, has been developed by Sun Microsystems, Inc, and is described in Request for Comments (RFC) 1094, available via the Internet. NFS is the most popular distributed file system. The basic entities of NFS architecture are servers and clients. The servers are stateless and their main task is to export a local file system. The clients access remote directories by mounting them. Location transparency is guaranteed.

Implementation is based on UNIX virtual file system (VFS) interface, which is used in this case to hide the locality/remoteness of access. When a client accesses a file, a call to the proper VFS function is made. If the file is local the request is serviced by the local file system. Otherwise the server is contacted to fulfil the request.

NFS uses a limited form of cooperative caching. Both servers and clients have caches. If the accessed block cannot be found in one client's cache, it is looked for in the server cache and only then brought from disk. Unfortunately the block is not searched in other clients' caches which would be faster than bringing it from the disk.

A major drawback of NFS is that the caches can become incoherent. When a client modifies its cache, the modification can be sent to the server as late as after 3 seconds for the data blocks and 30 seconds for directory blocks. Therefore the other clients will not see the modification until then. This choice was based on the assumption that file sharing is rare in a DFS.

NFS servers have also been criticized for not being scalable. When the number of clients increases, they saturate and become a bottleneck for the system. Servers and clients are also not fault-tolerant. If one of them fails it must be manually restarted and the modified cache contents may be lost.

NFS uses a simple pre-fetching policy based on spatial locality (when a block is accessed it is very probable that the next contiguous block will be needed in the near future). The client usually reads ahead next contiguous block of a file after it has got the currently accessed block.

"Petal" is a distributed logical disk. It is designed as a collection of storage servers that cooperate to manage a pool of physical disks. Petal provides a kernel driver interface, which hides the locality/remoteness of storage resources. Therefore all existing file systems can be run unmodified on top of it.

Petal can tolerate and recover transparently from any component failure: server, disk and network. It is also scalable, new storage can be added/removed transparently to/from the system.

"Frangipani" is a DFS running on top of Petal. Several independent file servers share the Petal distributed disk and synchronize using a distributed lock service. They are using non-cooperatively the UNIX buffer caches. The system is scalable, file server can be added/removed transparently to/from the system, without performance degradation.

"Zebra" is a DFS, which combined for the first time two ideas: log-structured file systems and RAID. Each client writes always into its own log. When the log is full it is striped and the stripes are written to different storage managers, which in turn can write them to disk in parallel.

The servers are responsible only for the administrative information (metadata), including pointers to data, which is stored and managed by storage managers. The servers are relieved of data transfer duties. Therefore they can become performance bottlenecks only in the case of frequent access of small files.

Zebra can tolerate and recover from single storage manager failures. It also uses a check-pointing strategy as the log-structured file systems for recovering from system crashes. The file server keeps its metadata on the storage managers and in case of crash it can recover it from there.

"XFS" proposes a server-less network file system and was the first one to implement cooperative caching. The system consists of workstations closely cooperating to provide all file system services in a scalable manner.

Like Zebra, XFS uses a combination of log-structured file systems and RAID ideas in order to improve the write performance and reliability. Unlike Zebra it distributes the control information across system at file granularity and uses cooperative caching to improve access performance. Each time a block is not found in the local cache it is looked for in other clients' caches and only as a last solution is brought from disk. Locality is encouraged by trying to keep the block in the cache of the machine where it is more likely to be accessed. In the cache replacement policy blocks that have multiple copies have priority to be replaced over the non-replicated blocks. XFS uses a token-based cache consistency scheme, which guarantees UNIX semantics to the applications.

One of the limitations of the classical server-client design of the file systems is that server machines can quickly become a bottleneck. One of the solutions proposed was to separate the storage from the host and to attach it to a high-performance network. Servers are relieved from data transfer duties, while the smart storage system (having a dedicated processor) is responsible for data management, including transfer and optimal placement.

The project Network Attached Secure Disks (NASD) aims at separating file management from file storage. File server responsibilities are reduced to access policies and decisions. Therefore when a client contacts the server for opening a file it receives an authorization token, which it can subsequently use for accessing the disks bypassing the servers.

The increasing development of mobile computing and the frequent poor connectivity have motivated the need for weakly connected services. The clients should be able to continue working in case of disconnection or weak connectivity and update themselves and the system after reintegration. Coda is a DFS, which exploits weak connectivity for mobile file access. Aggressive pre-fetching (hoarding) is employed for collecting data in anticipation of disconnection. If the wrong data is hoarded, progress can be hindered in case of disconnection. Another drawback is that cache coherence problems are more likely to occur and they may require user intervention. Unfortunately both aforementioned drawbacks can't be solved by system design, but by providing connectivity.

Many distributed file system implementations assume the most common application access patterns and hardware configurations and implement general mechanisms and policies, which have to be used by everyone. This results in performance penalties for the applications, which are not running under the implementation assumptions. Giving applications the possibility to enforce their own policy or making the replacement of policies easy would increase the performance of the system. Exokernels and microkernels are only two proposals which allow implementers to easily tailor policies to application needs by moving resource management in user space and offering a relative easy augmentation of system functionality compared with monolithic kernels. In the DFS case locality, caching and pre-fetching policies could mostly benefit from an implementation, which takes into account the application needs.

SUMMARY OF THE INVENTION

The present invention provides a distributed file system comprising a plurality of compute nodes and a plurality of input/output (I/O) nodes connected by an interconnection network wherein the system is adapted to use a common data representation for both physical and logical partitions of a file stored in the system and wherein the partitions are linearly addressable.

The system may include a metadata manager adapted to gather information about a file from the plurality of I/O nodes and maintain said I/O nodes in a consistent state. Preferably, the compute nodes are adapted to contact the metadata manager in the event of an event selected from the list of file creation, file opening, file closing and a request that involves metadata.

Preferably, the system is such that each compute node is programmed to perform a plurality of file operations comprising: computing mapping between a linear space of a file and a linear space of a subfile; performing an intersection algorithm between a view and a subfile; and performing a data operation.

In the preferred embodiment of the system, the file structure has at its core a representation for regular data distributions called PITFALLS (Processor Indexed Tagged FAmily of Line Segments), which is extensively presented in Shanklar Ramaswamy and Prithviraj Banerjee, "Automatic Generation of Efficient Array Redistribution Routines for Distributed Memory Multicomputers", in Proceedings of Frontiers '95: The Fifth Symposium on the Frontiers of Massively Parallel Computation, McLean, February 1995 (Ramaswamy et al.).

PITFALLS has been used in the PARADIGM compiler for automatic generation of efficient array redistribution routines at University of Illinois. The PITFALLS representation is extended in order to be able to express a larger number of access types. For instance all MPI data types can be expressed using our representation.

The invention further provides method of operating a distributed file system comprising a plurality of input/output (I/O) nodes and a plurality of compute nodes, the method comprising the steps of: partitioning a file into a plurality of subfiles distributed across ones of a plurality of I/O nodes; logically partitioning a file by setting a view on it; computing mappings between a linear space of said file and a linear space of a subfile; computing an intersection between a view and a subfile; and performing data operations.

The invention also provides a method of operating a distributed file system comprising a plurality of input/output (I/O) nodes and a plurality of compute nodes, the method comprising the steps of: physically partitioning a file into subfiles; logically partitioning a file into views; performing mapping functions between subfiles and views; and performing data redistribution between partitions.

Algorithms for performing the methods of the invention and which may be programmed in the system of the invention include an algorithm to compute a mapping of a position x from a linear space of a file on a linear space of a subfile; an algorithm to compute a mapping from a linear space of a subfile to a file; an algorithm to compute a mapping between a subfile and a view; an algorithm to compute a set of nested families of line segments representing intersections of families of line segments $f_1$ and $f_2$; an algorithm to compute the intersection two sets of nested families of line segments $S_1$ and $S_2$; and an algorithm to compute a projection of an intersection of two sets of families of line segments on a linear space described by each of the intersecting sets.

DETAILED DESCRIPTION

Figure 1:
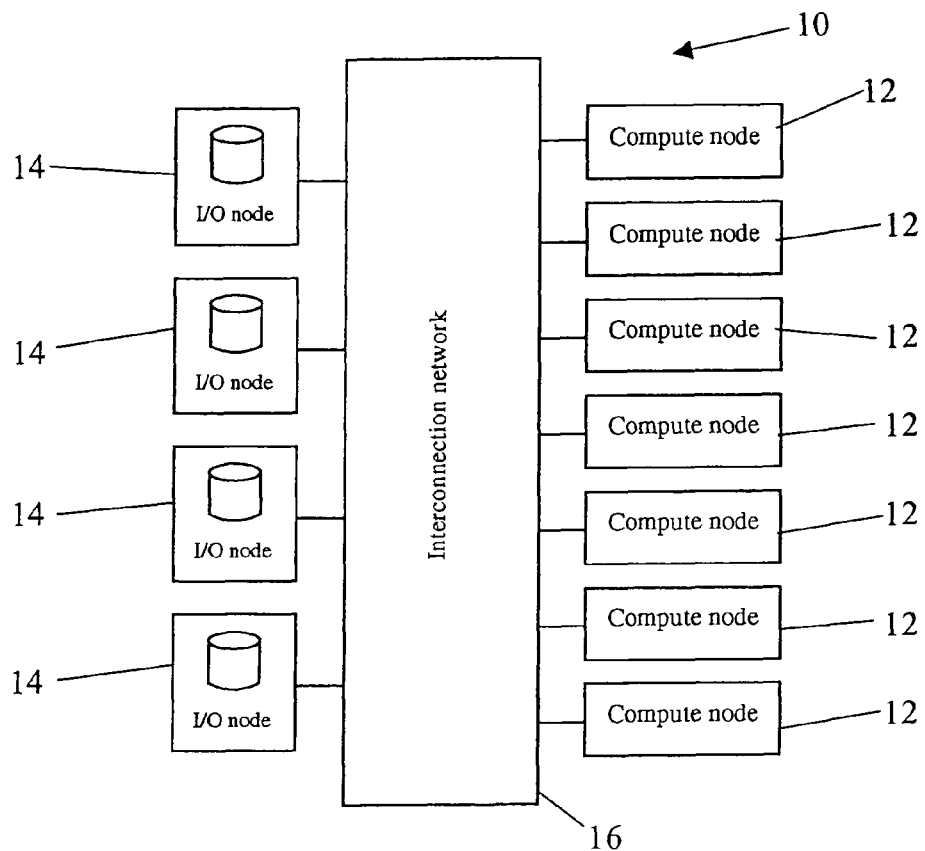
FIG. 1 shows a schematic representation of a distributed file system of an embodiment of the present invention.

A distributed file system, indicated generally by 10, is shown schematically in FIG. 1. The system 10 comprises a plurality of compute nodes 12 and a plurality of I/O nodes 14 connected by an interconnection network 16.

Figure 2:
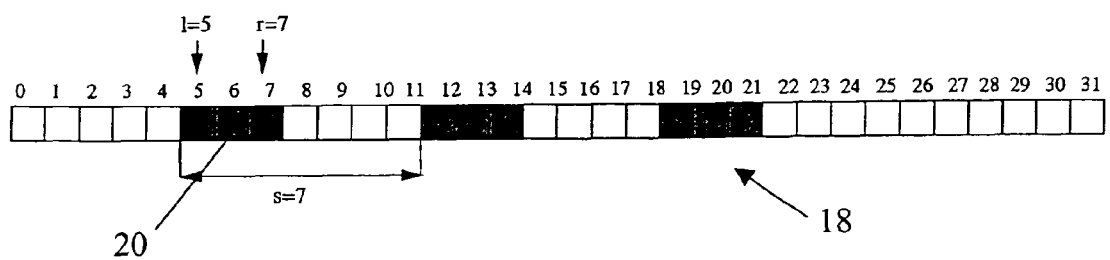
FIG. 2 shows a FALLS example (5, 7, 7, 3).

Referring to FIG. 2, there is shown an example of a family of line segments (FALLS) 18. A line segment (LS), for example line segment 20, is defined by a pair of numbers (l, r) and which describes a contiguous portion of a file staring at l and ending at r.

A family of line segments (FALLS) is a tuple (a message stored in shared memory space) (l, r, s, n) representing a set of n equally spaced, equally sized line segments. As shown in FIG. 2, the left index l of the first LS 20 is 5, the right index r of the first LS is 7 and the distance between every two LSs, called a stride and denoted by s, is 7. In FIG. 2, n is equal to 3. A line segment (l, r) can be expressed as the FALLS (l, r, –, 1). FIG. 2 thus shows an example of the FALLS (5, 7, 7, 3).

Figure 3:
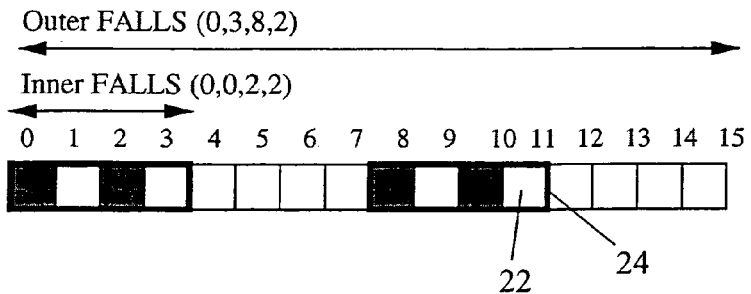
FIG. 3 shows a nested FALLS example.

A nested FALLS is a tuple (l, r, s, n, S) representing a FALLS (l, r, s, n), called an outer FALLS, together with a set of inner FALLS S. The inner FALLSs are located between l and r and relative to l. In constructing a nested FALLS it is advisable to start from the outer FALLS to inner FALLS. FIG. 3 shows an example of a nested FALLS (0, 3, 8, 2, {0, 0, 2, 2, Ø})). The outer FALLS 22 are indicated by thick lines 24.

Figure 4:
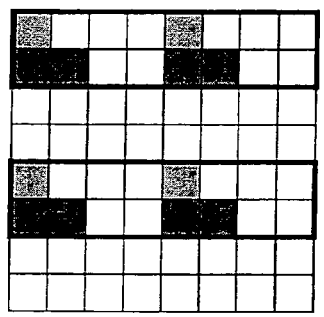
FIG. 4 shows a tree representation of a nested FALLS.
Figure 4:
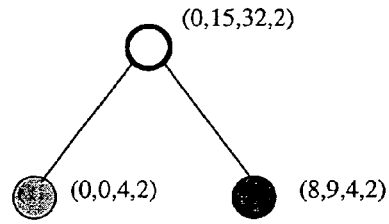

A nested FALLS can also be represented as a tree. Bach of the node of the tree contains a FALLS f and its children are the inner FALLS of f. FIG. 4 represents the nested FALLS (0, 15, 32, 2, {(0, 0, 4, 2, Ø), (8, 9, 4, 2, Ø)}).

A set of nested FALLS is to be seen as a collection of line segments, compactly representing a subset of a file. The xth byte of a file belongs to a set of nested FALLS S if it lies on one of line segments of S.

Figure 5:
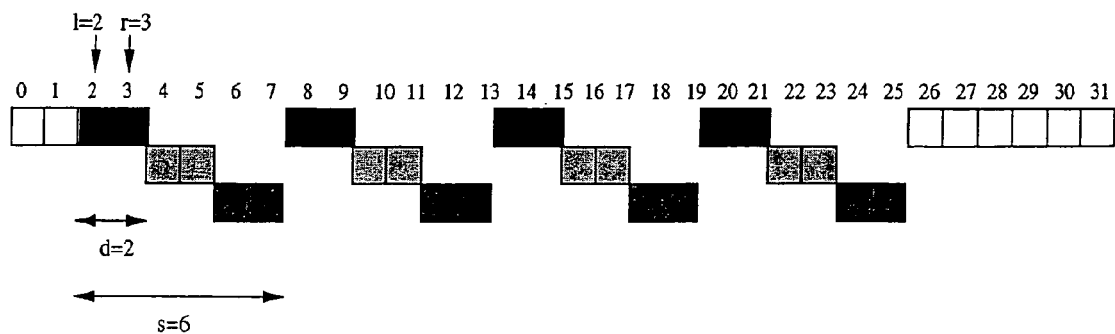
FIG. 5 shows a PITFALLS example (2, 3, 6, 4, 2, 3).

A set of FALLS can be shortly expressed using the PITFALLS representation, which is a parameterized FALLS, where the parameter is the processor (I/O node) number. The PITFALLS consists of a tuple (l, r, s, n, d, p) which represents a set of p equally spaced FALLS, the distance between the beginning of two consecutive FALLS being d: (l+id, r+id, s, n), for i=0, p–1. A FALLS (l, r, s, n) can be expressed as the PITFALLS (l, r, s, n, –, 1) and a line segment (l, r) as (l, r, –, 1, –, 1). FIG. 5 shows the PITFALLS (2, 3, 6, 4, 2, 3) which is the compact representation of p=3 FALLS spaced at d=2: (2, 3, 6, 4), (4, 5, 6, 4) and (6, 7, 6, 4).

Figure 6:
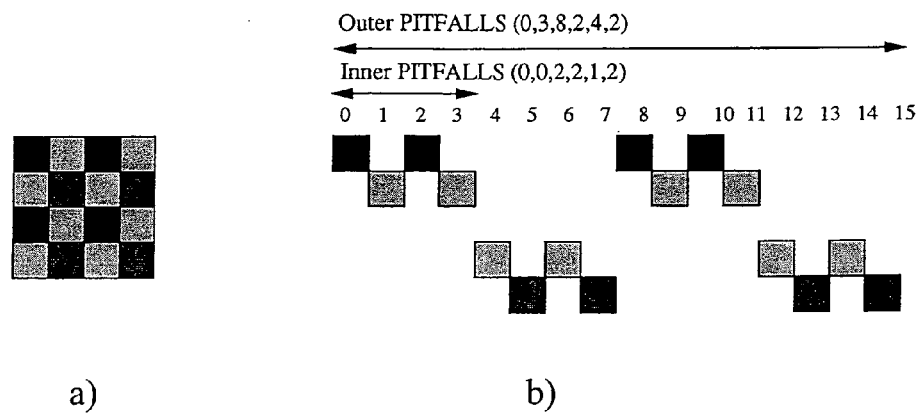
FIG. 6 shows a nested PITFALLS example.

A nested PITFALLS is a tuple (l, r, s, n, d, p, S) representing a PITFALLS (l, s, n, d, p, S), called outer PITFALLS together with a set of inner PITFALLS S. The outer PITFALLS compactly represents p outer FALLS (l+id, r+id, s, n), for i=0; p–1. Each outer FALLS contains a set of inner PITFALLS between l+id and r+id, with indices relative to l+id. In constructing a nested PITFALLS it is advisable to start from the outer PITFALLS to inner PIT-FALLS. FIG. 6 shows an example of a nested PITFALLS which represents a two dimensional block cyclic distribution of a 4×4 matrix over 4 I/O nodes/processors. The distribution is compactly expressed: {(0, 3, 8, 2, 4, 2, {((0, 0, 2, 2, 1, 2, Ø))})}. The outer PITFALLS is the compact representation of two FALLS (0, 3, 8, 2) and (4, 7, 8, 2), each of them containing an inner PIT-FALLS (0, 0, 2, 2, 1, 2).

The preferred embodiment uses sets of nested PITFALLS for representing the physical partitioning of a file onto I/O nodes, the logical partitioning of a file onto compute nodes and the mappings between them. However the programming interface avoids the complexity of nested PITFALLS. Specifying the logical and physical distributions can be done in a way similar to High-Performance Fortran.

There are three main reasons for choosing nested PIT-FALLS as the core of the data representation. First, they are flexible enough to express an arbitrary distribution of data.

For instance, any MPI data type can be expressed using a set of nested PITFALLS. This is because of the fact that in the extreme case, a nested PITFALLS is just a line segment, for n=1 and p=1. Therefore, a set of nested PITFALLS can represent also irregular patterns. Second, they offer a compact way of expressing complex regular distributions. For instance, a multidimensional array distribution on several I/O nodes or processors can be simply expressed as a nested PITFALLS. Third, there are efficient algorithms for converting one distribution into another. For instance, Ramaswamy et al. contains a description of an algorithm which performs efficient multi-dimensional array redistributions of data represented in PITFALLS form. Starting from this algorithm, and using sets of nested PITFALLS, as data representation, we have designed an algorithm which performs arbitrary redistributions.

In the present case, converting one distribution into another is useful in two scenarios. First we convert the physical partitioning (the distribution of the data on the I/O nodes and their disks) into the logical partitioning as required by the applications and vice-versa. This is the case when the physical partitioning doesn't correspond exactly to the application requirements. Second, we allow converting between two physical distributions. This could be useful when the application would have to benefit at run-time more from a new physical distribution than from the existing one.

The block length of a FALLS f is denoted by $LEN_f$ and represents the number of bytes in f's block.

$$LEN_f = r_f - l_f + 1 \qquad (1)$$

For instance, the block length of the outer FALLS of the nested FALLS from FIG. 3 is 4 and that of the inner FALLS is 1.

A nested FALLS is a set of indices which represent a subset of a file. The size of a nested FALLS f is the number of bytes in the subset defined by f. The size of a set of nested FALLS S is the sum of sizes of all its elements. The following two mutual recursive equation express formally the previous two definitions.

$$SIZE_f = \begin{cases} n_f LEN_f & \text{if } I_f = 0 \\ n_f SIZE_{I_f} & \text{otherwise} \end{cases} \quad (2)$$

$$SIZE_S = \sum_{f \in S} SIZE_f \quad (3)$$

For instance, the size of the nested FALLS from FIG. 3 is 4.

A set of FALLS is called contiguous between l and r if it describes a region without holes between l and r. For instance, the set containing the FALLS from FIG. 2 is contiguous between 11 and 14, but it is not contiguous between 3 and 8.

The preferred embodiment divides the nodes of a cluster in two sets, which may or may not overlap: compute nodes and I/O nodes. The I/O nodes store the file data. The applications are running on the compute nodes. There is also one metadata manager, that centralizes the file metadata.

A file in the preferred embodiment is a linear addressable sequence of bytes. Files can be physically partitioned in subfiles and logically partitioned in views. The file is physically partitioned into one or more non-overlapping, linear addressable subfiles. The partitioning is described by a file displacement and a partitioning pattern. The displacement is an absolute byte position relative to the beginning of the file. The partitioning pattern P consists of the union of n sets of nested FALLS $S_0, S_1, \ldots, S_{n-1}$, each of which defines a subfile.

$$P = \bigcup_{i=0}^{n-1} S_i \quad (4)$$

The sets must describe non-overlapping regions of the file. Additionally, P must describe a contiguous region of the file. The partitioning pattern uniquely maps each byte of the file on a pair subfile-position within the subfile, and is applied repeatedly throughout the linear space of the file, starting at the displacement.

We define the size of the partitioning pattern P to be the sum of the sizes of all of its nested FALLS.

$$SIZE_P = \sum_{i=0}^{n-1} SIZE_{S_i} \quad (5)$$

Figure 7:
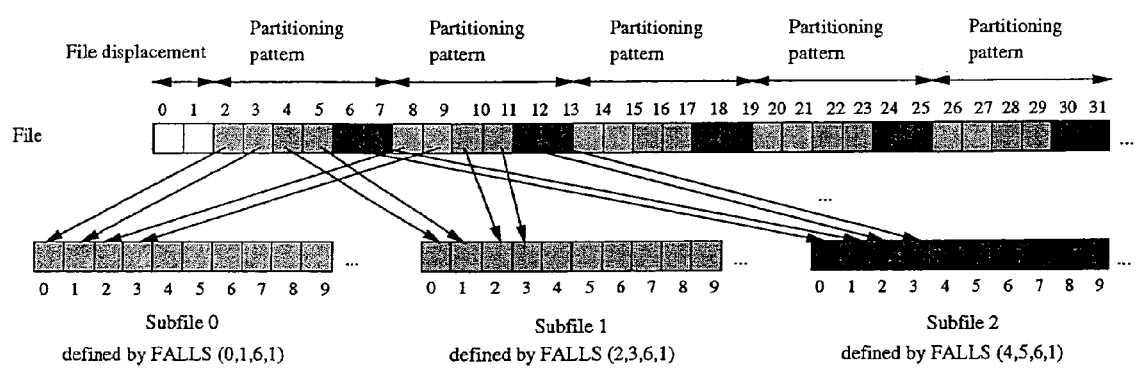
FIG. 7 shows a file partitioning example.

FIG. 7 illustrates a file, having displacement 2, physically partitioned in 3 subfiles, defined by FALLS (0, 1, 6, 1, Ø), (2, 3, 6, 1, Ø), and (4, 5, 6, 1, Ø). The size of the partitioning pattern is 6. The arrows represent mappings from the file's linear space to the subfile linear space. The same mechanism is employed for logical partitioning of the file in views.

Figure 8:
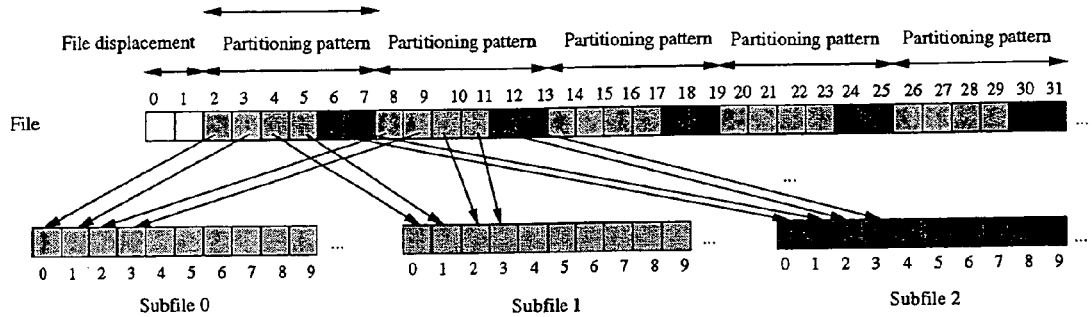
FIG. 8 shows further file partitioning examples.
Figure 8:
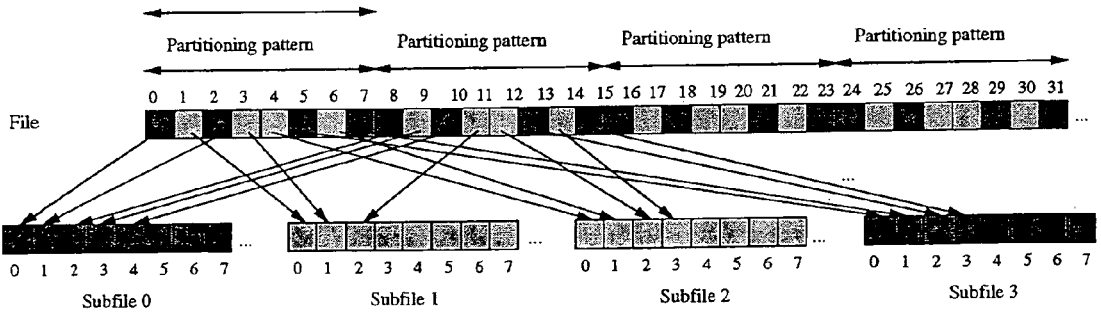

The partitioning pattern of a file onto its subfiles can be more compactly expressed in the case of regular distributions by using nested PITFALLS. FIG. 8 illustrates the file structure by two examples. In the example in FIG. 8(a) the file consists of 3 subfiles created by using the PITFALLS (0, 1, –, 1, 2, 3, Ø), relative to the displacement 2. This shows a file with the displacement 2 and composed of three subfiles. The file is laid out on the subfiles in a round robin manner.

The example in the FIG. 8(b) shows a file composed of 4 subfiles built by using the nested PITFALLS (0, 3, –, 1, 4, 2, {((0, 0, 2, 2, 1, 2, Ø))}). This represents a two dimensional block-cyclic distribution of a file in subfiles.

If n is the number of I/O nodes assigned to a file and b, the size of a file block, then round-robin distribution of file blocks over the I/O nodes is represented by the PITFALLS (0, b–1, –, 1, b, n, Ø). This representation splits the file in n subfiles. Each of them could reside on a different I/O node.

A subfile can either be written sequentially at a single I/O node or be spread over several I/O nodes.

Figure 9:
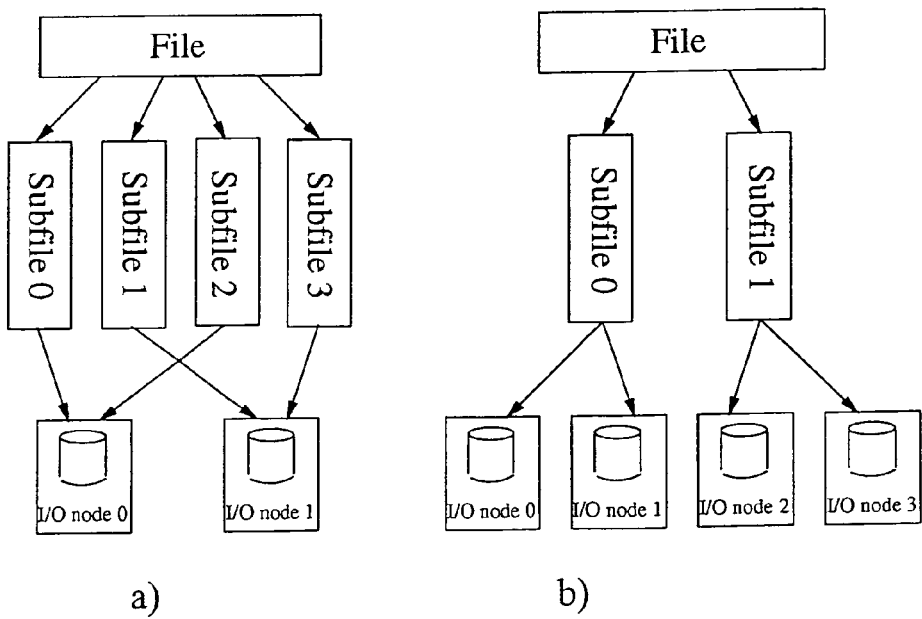
FIG. 9 shows examples of subfile assignments on I/O nodes.

If the number of subfiles is greater than the number of I/O nodes, each subfile is written sequentially at a single I/O node. Subfiles are assigned to I/O nodes in a round robin manner. FIG. 9(a) shows a file composed of four subfiles and written to two I/O nodes. Subfiles 0 and 2 are assigned to I/O node 0, whereas subfiles 1 and 3 to I/O node 1.

In the case that the number of subfiles of a file is less than the number of I/O nodes, the subfiles are by default spread on disjointed sets of I/O nodes. This approach maximizes the parallelism within the file and allows the applications to take advantage of the aggregate bandwidth of all the I/O nodes. For example, a file structured as a single subfile can distribute its data in a round-robin manner on all I/O nodes. Another example from FIG. 9(b) shows a file composed of two subfiles and stored on four I/O nodes. Each of the two subfiles is striped in round-robin manner over two I/O nodes.

The physical partitioning is very flexible, but the applications might have different requirements for the same file layout. Therefore applications are allowed to logically partition a file by setting a view on it. A view is a linear addressable sequence of bytes which is mapped on a subset of data of an open file. When an application opens a file it has by default a view on the whole file. Subsequently it might change the view according to its own needs. An important advantage of using views is that it relieves the programmer from complex index computation. Once the view is set the application has a logical sequential view of the set of data it needs and can access it in the same manner it accesses an ordinary file.

Setting a view gives the opportunity of early computation of mappings between the logical and physical partitioning of the file. The mappings are then used at read/write operations for gathering/scattering the data into/from messages. The advantage of this approach is that the overhead of computing access indices is paid just once at view setting. Views can also be seen as hints to the operating system. They actually disclose potential future access patterns and can be used by I/O scheduling, caching and pre-fetching policies. For example, these hints can help in ordering disk requests, laying out of file blocks on the disks, finding an optimal size of network messages, choosing replacement policies of the buffer caches, etc.

Figure 10:
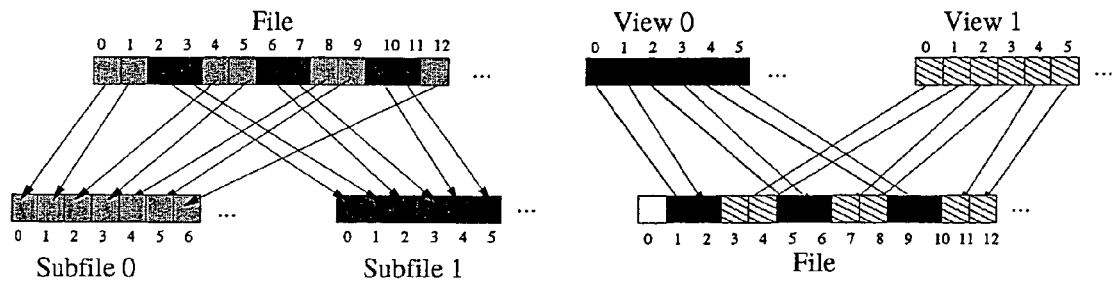
FIG. 10 shows View-subfile mappings.
Figure 10:
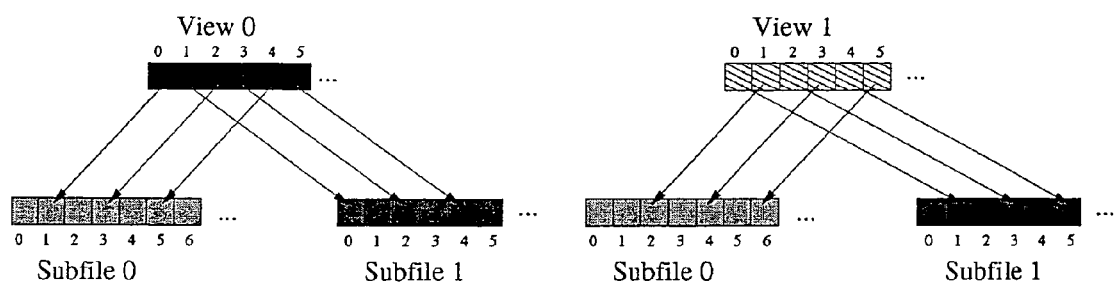
Figure 10:
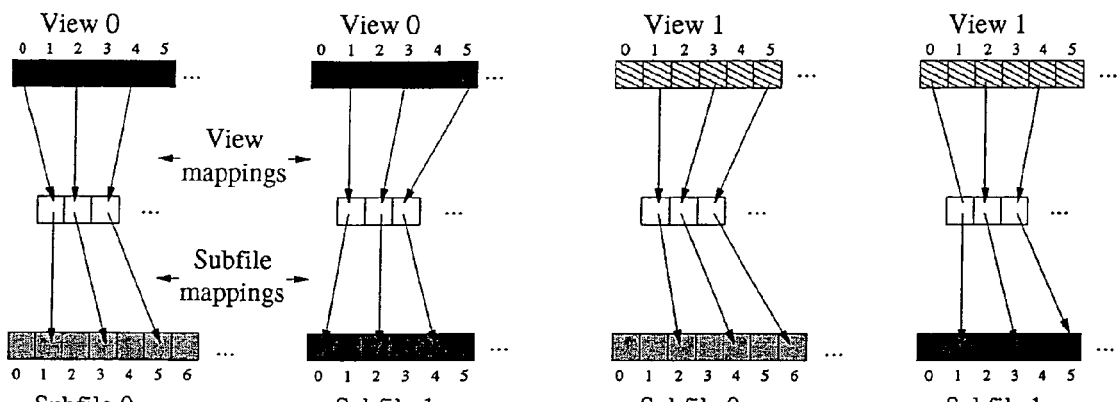

The logical partitioning of an application might not be the same as the physical partitioning of the file into sub-files. Therefore, each time a view is set, the direct mapping between the view and the file has to be computed. FIG. 10(a) shows the physical partitioning of a file in two sub-files using the PITFALLS (0, 1, 4, 2, 1, 2, Ø). FIG. 10(b) shows the logical partitioning of the file by two compute nodes, which is different from the physical partitioning. Node 0 uses the PITFALLS (1, 2, 4, 2, –, 1, Ø) and node 1 (3, 4, 4, 2, –, 1, Ø). FIG. 10(c) shows the direct mapping between logical and physical partitioning.

In order to make the direct mapping computation efficient for the case of regular distributions, as for instance multidimensional array distributions, we used an array redistribution algorithm described in Ramaswamy et al. In this algorithm, two regular distributions are represented as PITFALLS and their intersection is computed. The intersection represents the mapping of one distribution onto the other. We modified the algorithm to compute arbitrary intersections of sets of nested PITFALLS. Since both views and subfiles are represented as sets of nested PITFALLS, we use this algorithm to compute the intersection between them, which represents the direct mapping, as shown in FIG. 9(c).

If the access pattern and the file layout do not match, the direct mapping might result in sending small messages over the network. In order to coalesce more small messages into a single one, the direct mapping is split between a view and a subfile into two parts: the view mapping and the subfile mapping.

The view mapping is the mapping of the view onto a linear buffer, for a given subfile, used by the compute node for network transfer of view data. The subfile mapping is the mapping of the subfile onto a linear buffer, for a given view, used by the I/O node for network transfer of subfile data. FIG. 10(d) shows how the direct mapping from FIG. 10(c) is split into a view mapping and a subfile mapping. The view and subfile mapping are computed at compute node, after the view is set. The view mapping is kept at compute node and the subfile mapping is sent to the I/O node where the subfile resides.

The view and subfile mappings are needed only in the case a non-contiguous region of the view/subfile has to be transferred between a compute node and an I/O node. They are pre-computed at view setting time, and used by access time in scatter-gather operations, if needed. Otherwise the transfer is done without re-copying. For instance, if a contiguous region of a view maps contiguously on a subfile, no auxiliary buffer is needed for coalescing data.

Reading and writing data can be seen as a two-phase operation. The first phase is represented by the pre-computing of mappings described in the previous subsection. The second phase is the effective data reading or writing.

Effective data reading and writing is done on the views and using the mappings pre-computed in the first phase. If an application wants to write a buffer to a file, the following steps take place: (a) for every involved subfile the view mapping used to gather the data from the view in a single message (b) the message is sent to the I/O node (c) the I/O node uses the subfile mapping to write the data in the sub-file. The reverse process takes place at data reading. For example, suppose that in FIG. 10(d) the compute node 0, which has already set the view, writes a buffer of four elements to the view from 1 to 4. The view mapping for subfile 0 is used to coalesce the bytes 2 and 4 to a message, which is sent to I/O node of subfile 0. At the I/O node of subfile 0, the subfile mapping for view 0 is used to write the data at address 3 and 5. The same process takes place for bytes 1 and 3 of the view 0 which are written to subfile 1 at addresses 0 and 2.

In order to prove the efficiency of our approach we have built an experimental parallel file system running on LINUX and it is implemented completely in user-level.

The preferred embodiment has three main components: a metadata manager, an I/O server and an I/O library. Each node of the cluster can play the role of a compute node, I/O server, or both tart time I/O node), but only one node can be a metadata manager.

There is one metadata manager running in the parallel file system. The metadata manager gathers periodically or by request information about a file from the I/O nodes and keeps them in a consistent state. It also offers per request services involving file metadata to the compute nodes. The metadata manager is not involved in the data transfer.

Metadata represents information about the file such as: the file structure (the partitioning of the file in subfiles, the I/O servers on which the file is written), file size, creation and modification time, etc.

The metadata manager is contacted by the compute nodes at file creation, open, close, or at any request that involves file metadata.

If the file is created and the compute node doesn't specify a layout for the file, the default layout (striping the file blocks in round-robin manner over all I/O nodes) is chosen. If a file layout is specified, it is stored at the metadata manager. Each subsequent re-open will retrieve the layout information along with a unique file descriptor.

There is one I/O server running on each I/O node in the parallel file system.

The main task of the I/O server is writing and reading the data to/from the subfiles. A connection between a compute node and an I/O server is established at view setting or at the first access if no view was previously set. When a view is set the I/O server also receives the subfile mapping of the view, which it will use for future accesses as described earlier. I/O servers keep metadata about each of the subfiles and deliver it per request to the metadata manager.

Each compute node specifies operations on the file system by using an I/O library. The I/O library implements the UNIX standard file system interface. At this moment it is implemented at user-level. The communication between the compute node and metadata manager or I/O servers is hidden by the library from the applications.

The applications can set the layout of the file by using a user-level variant of the standard UNIX ioctl operation. The layout setting has to follow a create call. The layout is sent at the metadata manager, but it is also kept by the compute node.

Setting the view on a file is also done by an ioctl. As described earlier this is the time when the view and subfile mappings are computed. The subfile mapping is sent to the corresponding I/O node, while the view mapping is kept at compute node.

Given a subfile/view described by a set of nested FALLS S, we now describe how to build two functions $MAP_S(x)$ and $MAP_S^{-1}(x)$ that compute the mappings between the linear space of a file and the linear space of a subfile. For instance, if the subfile is described by the set of nested FALLS $\{(2, 3, 6, 1, \emptyset)\}$, as in FIG. 7, the 10th byte of the file maps on 2nd byte of the subfile ($MAP_S(10)=2$) and vice-versa ($MAP_S^{-1}(2)=10$).

$MAP_S(x)$ computes the mapping of a position x from the linear space of the file on the linear space of the subfile defined by S, where S belongs to the partitioning pattern P. The $MAP_S(x)$ is the sum of the map value of the begin of the current partitioning pattern and the map of the position within the partitioning pattern.

$MAP_S(x)$

1: $((x-displ) \text{ div } SIZE_P)SIZE_S + MAP\text{-}AUX_S((x-displ) \bmod SIZE_P)$ $MAP\text{-}AUX_S(x)$ computes the file-subfile mapping for a set of nested FALLS. Line 1 of $MAP\text{-}AUX_S(x)$ identifies the nested FALLS j of S onto which x maps. The returned map value (line 2) is the sum of total size of previous FALLS and the mapping onto $f_j$, relative to $l_{f_j}$, the beginning of $f_j$.

$MAP\text{-}AUX_S(x)$

1: $j \leftarrow \min\{k \mid x > l_{f_k}\}$

2: return $\sum_{i=0}^{j-1} SIZE_{f_i} + MAP\text{-}AUX_{f_i}((x - l_{f_i}) \bmod s_{f_i} c_{f_i})$ MAP-AUX$_f$(x) maps position x of the file onto the linear space described by the nested FALLS f. The returned value is the sum of the sizes of the previous blocks off and the mapping on the set of inner FALLS, relative to the current block begin.

MAP-AUX$_f$(x)

```
1:    if I_f = Ø then
2:        return (x div S_f)LEN_f + x mod S_f
3:    else
4:        return (x div S_f)SIZE_{I_f} + MAP-AUX_{I_f}(x mod S_f)
5:    end if
```

For instance, for the subfile described by the nested FALLS S=(0, 1, 6, 1, Ø) in FIG. 7, the file-subfile mapping is computed by the function:

$$MAP_S(x) = 2((x-2)\text{div}6) + (x-2)\text{mod } 6 \qquad (6)$$

Notice that MAP$_S$(x) computes the mapping of x on the subfile defined by S, only if x belongs to one of the line segments of S. For instance, in FIG. 7, the 5th byte of the file doesn't map on subfile 0. However, it is possible to slightly modify MAP-AUX$_f$, to compute the mapping of either the next or the previous byte of the file, which directly maps on a given subfile. The idea is to detect when x lies outside any block of f and to move x to the end of the current stride (next byte mapping) or end of the previous block (previous byte mapping), before executing the body of MAP-AUX$_f$. For FIG. 7, the previous map of file offset 5 on subfile 0 is subfile offset 1 and the next map is subfile offset 2.

MAP$_S^{-1}$ computes the mapping from the linear space of a subfile described by S to the file as the sum of the start position of the current partitioning pattern and position within the current partitioning pattern.

MAP$_S^{-1}$ (x)

1: displ+(x div SIZE$_S$)SIZE$_P$+MAP-AUX$_S^{-1}$ (x mod SIZE$_S$)

MAP-AUX$_S^{-1}$ (x) looks for the FALLS f$_j \in$ S, in which x is located. The result is the sum of l$_{f_j}$, the start position of f$_j$, and the mapping within f$_j$ of the remaining offset.

MAP-AUX$_S^{-1}$ (x)

$$1: j \leftarrow \max\left\{k \mid x < \sum_{i=0}^{k} SIZE_{f_i}\right\}$$

$$2: \text{return } l_{f_j} + MAP\text{-}AUX_{f_j}^{-1}\left(x - \sum_{i=0}^{j-1} SIZE_{f_i}\right)$$

MAP-AUX$_f^{-1}$ (x) maps position x of the linear space described by the nested FALLS f on the file. The result is the sum of mapping the begin of the inner FALLS off and the mapping of the position remainder on the inner FALLS.

MAP-AUX$_f^{-1}$ (x)

```
1:    if I_f = Ø then
2:        return (x div LEN_f)s_f + x mod LEN_f
3:    else
4:        return (x div SIZE_{I_f})s_f + MAP-AUX_{I_f}^{-1} (x mod SIZE_{I_f})
5:    end if
```

For instance, for the view described by the nested FALLS S=(0, 1, 6, 2, Ø) in FIG. 7, the subfile-file mapping is computed by the function:

$$MAP_S^{-1}(x) = 2 + 6(x \text{ div} 2) + x \text{ mod } 2 \qquad (7)$$

Given a subfile S and a view V we compute the direct mapping of x between S and V as MAP$_S$(MAP$_V^{-1}$ (x)). For instance, in FIG. 10(b), the mapping of the view offset 4 on the subfile is MAP$_S$(MAP$_V^{-1}$ (4))=4.

It can be noticed that MAP$_S^{-1}$ actually represents the inverse of MAP$_S$, for the same S:

$$MAP_S^{-1}(MAP_S(x)) = MAP_S(MAP_S^{-1}(x)) = x \qquad (8)$$

As a consequence, if the logical and physical partitioning are the same, each view maps exactly on a subfile. Therefore, every contiguous access of the view translates in a contiguous access of the subfile. This represents the optimal physical distribution for a given logical distribution.

The preferred embodiment represents both view and subfile partitions by using sets of nested FALLS. Each set of nested FALLS, representing a set of indices in the file linear space, describes a subset of a file. By accessing file data through a view, the accessed region might map on several subfiles. Therefore, in order to redistribute the data to the right subfile, the intersection between the view and each subfile has to be computed. The intersection algorithm described below computes the set of nested FALLS that can be used to represent data common to the representation of two sets of nested FALLS. The indices of the sets of nested FALLS are given in file linear space. These sets of indices can be projected on the linear space of a view or a subfile.

The nested FALLS intersection algorithm below is based on the FALLS intersection algorithm from Ramaswamy et al., INTERSECT-FALLS (f$_1$, f$_2$), which efficiently computes the set of nested FALLS, representing the intersection of f$_1$ and f$_2$.

Figure 11:
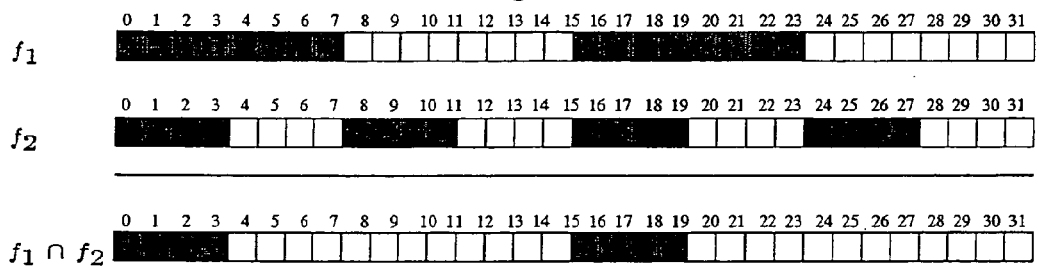
FIG. 11 shows schematically a FALLS intersection algorithm and method.
Figure 11:
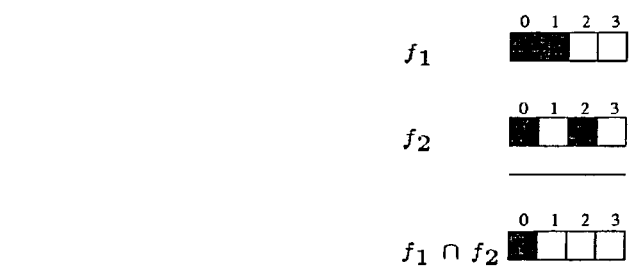

FIG. 11 shows two examples: (a) INTERSECT-FALLS ((0, 7, 16, 2), (0, 3, 8, 4))=(0, 3, 16, 2) and (b) INTERSECT-FALLS ((0, 1, 4, 1), (0, 0, 2, 2))=(0, 0, 4, 1).

In Ramaswamy et al., INTERSECT-FALLS is used in array redistributions. The old and new distributions of an n-dimensional array are represented as FALLS on each dimension and the intersection is performed independently on each dimension. Since an aim of the preferred embodiment is to provide arbitrary redistributions, the multidimensional array redistribution is not suitable. An algorithm is required which allows arbitrary redistributions, while efficiently performing multidimensional array redistribution.

The following procedure computes the set of FALLS which results from cutting a FALLS f between an inferior limit l and superior limit r. The resulting FALLS are computed relative to l. We use this procedure in the nested FALLS intersection algorithm.

CUT-FALLS (f,l,r)

```
1:    DBF g:FALLS
2:    l_g ← 1; r_g ← r; s_g ← LEN_g; n_g ← 1
3:    S ← INTERSECT-FALLS(f,g)
4:    for all h ∈ S do
5:        l_h ← l_h - 1
6:        r_h ← r_h - 1
7:    end for
8:    return S
```

Figure 12:
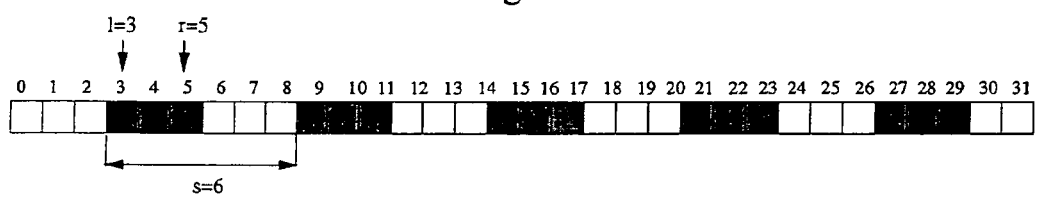
FIG. 12 shows a further FALLS example (3, 5, 6, 5).

For example, cutting the FALLS (3, 5, 6, 5) from FIG. 12 between l=4 and r=28 results in set {(0, 1, 1, 2), (5, 7, 6, 3), (23, 24, 2, 1)}, computed relative to l=4.

The algorithm for intersecting sets of nested FALLS $S_1$ and $S_2$ will now be described, belonging to the partitioning patterns $P_1$ and $P_2$, respectively. The sets contain FALLS in the tree representation. The algorithm assumes, without loss of generality, that the trees have the same height. If they don't, the height of the shorter tree can be transformed by adding outer FALLS.

INTERSECT computes the size of the partitioning pattern P of the intersection, as the lowest common multiplier of the sizes of $P_1$ and $P_2$ (line 1). Subsequently $S_1$ and $S_2$ are extended, such that they could be intersected over the size of P (lines 2-7).

INTERSECT $(S_1, S_2)$

```
1:     SIZE_P ← lcm(SIZE_P1, SIZE_P2)
2:     for all f ∈ S_1 do
3:         n_f ← n_f SIZE_P/SIZE_P2
4:     end for
5:     for all f ∈ S_2 do
6:         n_f ← n_f lcm(SIZE_P1, SIZE_P2)/SIZE_P2
7:     end for
8:     return INTERSECT-AUX( S_1, 0, ; SIZE_P, S_2, 0, SIZE_P)
```

INTERSECT-AUX computes the intersection between two sets of nested FALLS $S_1$ and $S_2$, by recursively traversing the FALLS trees (line 12), after intersecting the FALLS pair-wise (line 8).

INTERSECT-AUX considers first all possible pairs $(f_1, f_2)$ such that $f_1 \in S_1$ and $f_2 \in S_2$. The FALLS $f_1$ is cut between the left and right index of intersection of outer FALLS of $S_1$ and $S_2$ (line 4), $l_1$ and $r_1$. The indices $l_1$ and $r_1$ are computed relative to outer FALLS of $S_1$, and are received as parameters of recursive call from line 12. The same discussion applies to $f_2$ (line 5). CUT-FALLS is used for assuring the property of inner FALLS of being relative to left index of outer FALLS. The FALLS resulting from cutting $f_1$ and $f_2$ are subsequently pair-wise intersected (line 8). The recursive call descends in the subtrees of $f_1$ and $f_2$ and computes recursively the intersection of their inner FALLS (line 12).

INTERSECT-AUX $(S_1, l_1, r_1, S_2, l_2, r_2)$

```
1:     S ← 0
2:     for all f_1 ∈ S_1 do
3:         for all f_2 ∈ S_2 do
4:             C_1 ← CUT-FALLS(f_1, l_1, r_1)
5:             C_2 ← CUT-FALLS(f_2, l_2, r_2)
6:             for all g_1 ∈ C_1 do
7:                 for all g_2 ∈ C_2 do
8:                     S ← S∪INTERSECT-FALLS(g_1, g_2)
9:                 end for
10:            end for
11:            for all f ∈ S do
12:                I ← INTERSECT-AUX(I_f1, (l_f − l_f1) mod s_f1,
                       (r_f − l_f1) mod s_f1, I_f2; (l_f − l_f2)
                       mod s_f2, (r_f − l_f2) mod s_f2)
13:            end for
14:        end for
15:    end for
16:    return S
```

Figure 13:
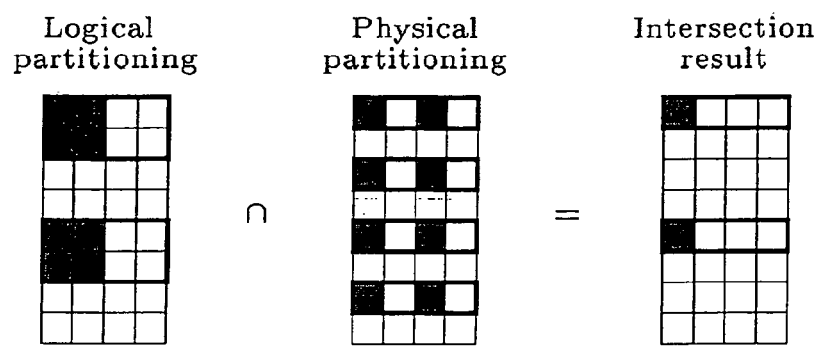
FIG. 13 shows schematically a nested FALLS intersection algorithm and method.
Figure 13:
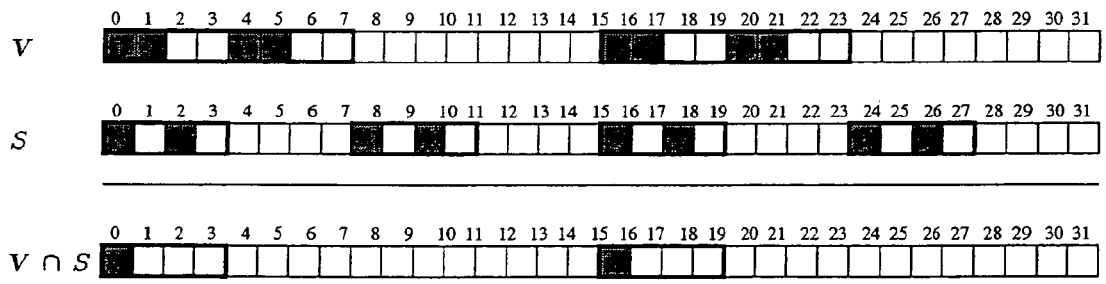
Figure 13:
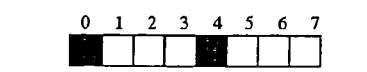
Figure 13:
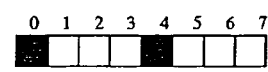

For instance, FIG. 13 shows the intersection of two sets of nested FALLS; $S_1 = (0, 7, 16, 2, (0, 1, 4, 1, \emptyset))$ and $S_2 = (0, 3, 8, 4, (0, 0, 12, 2, \emptyset))$, belonging to partitioning patterns of size 32. The outer and the inner FALLS intersections were already shown in FIG. 11. The intersection result is $V \cap S = (0, 3, 16, 2, (0, 0, 4, 1, \emptyset))$, which can be simplified to $(0, 1, 16, 2, \emptyset)$.

The algorithm above computes the intersection S of the two sets of FALLS $S_1$ and $S_2$. Consequently S is a subset of both $S_1$ and $S_2$. The projection procedure is a procedure for projecting S on the linear space (view or subfile) described by $S_1$ and $S_2$. This projection is used in scattering and gathering data exchanged between a compute node and an I/O node, as shown below.

$PROJ_S(R)$ computes the projection of R on S. It simply calls an auxiliary procedure PROJ-AUX.

$PROJ_S(R)$

1: PROJ-AUX$_S$(R, 0)

PROJ-AUX$_S$(R, offset) traverses the trees representing the FALLS of R and it projects each FALLS on the subfile described by S. The argument offset is needed because each set of inner FALLS is given relative to the left index of the outer FALLS. Therefore, offset accumulates the absolute displacement from the subfile beginning.

PROJ-AUX$_S$(R, offset

```
1:     P ← 0
2:     for all f ∈ R do
3:         p ← PROJ-AUX_S(f, offset)
4:         if I_f ≠ 0 then
5:             I_p ← PROJ-AUX_S(I_f, offset + l_f)
6:         end if
7:         P ← P ∪ {p}
8:     end for
9:     return P
```

PROJ-AUX$_S$(f, offset) projects a FALLS f displaced with offset to the subfile described by S.

PROJ-AUX$_S$(f, offset)

```
1:     DEF g:FALLS
2:     l_g ← MAP_S(l_f + offset) − MAP_S(offset)
3:     r_g ← MAP_S(r_f + offset) − MAP_S(offset)
4:     s_g ← MAP_S(s_f + offset) − MAP_S(offset)
5:     n_g ← n_f
6:     return g
```

For instance, for the example given above relating to intersection, $PROJ_V(V \cap S) = (0, 0, 4, 2, \emptyset)$ (FIG. 13(c)) and $PROJ_S(V \cap S) = (0, 0, 4, 2, \emptyset)$ (FIG. 13(d)).

INTERSECT and $PROJ_S$ can be compacted in a single algorithm, as they are both traversing the same sets of trees. For the sake of clarity, we have presented them separately.

Figure 14:
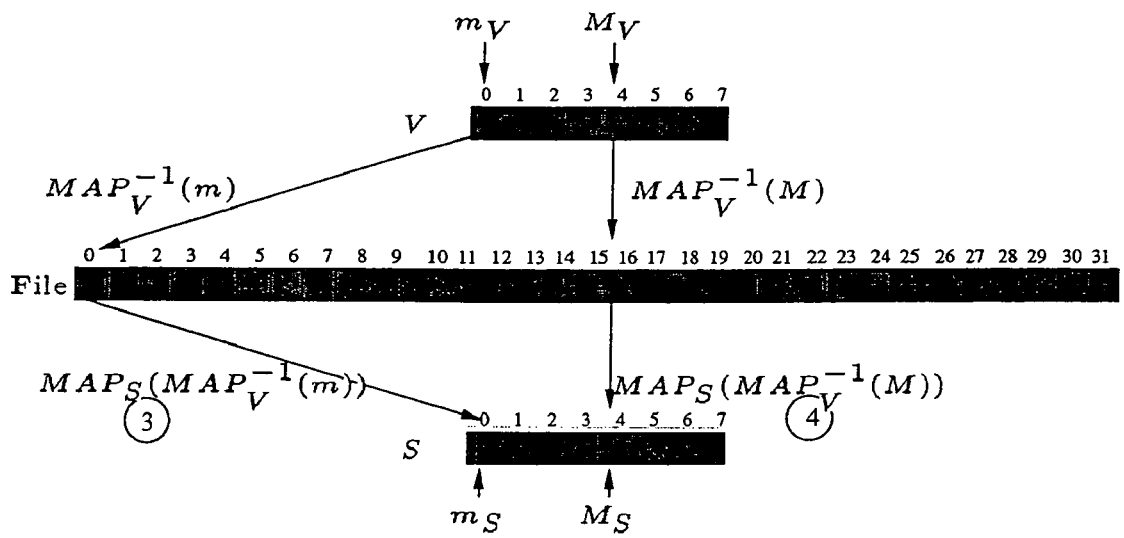
FIG. 14 shows schematically the write operation in the embodiment and/or method of the present invention.
Figure 14:
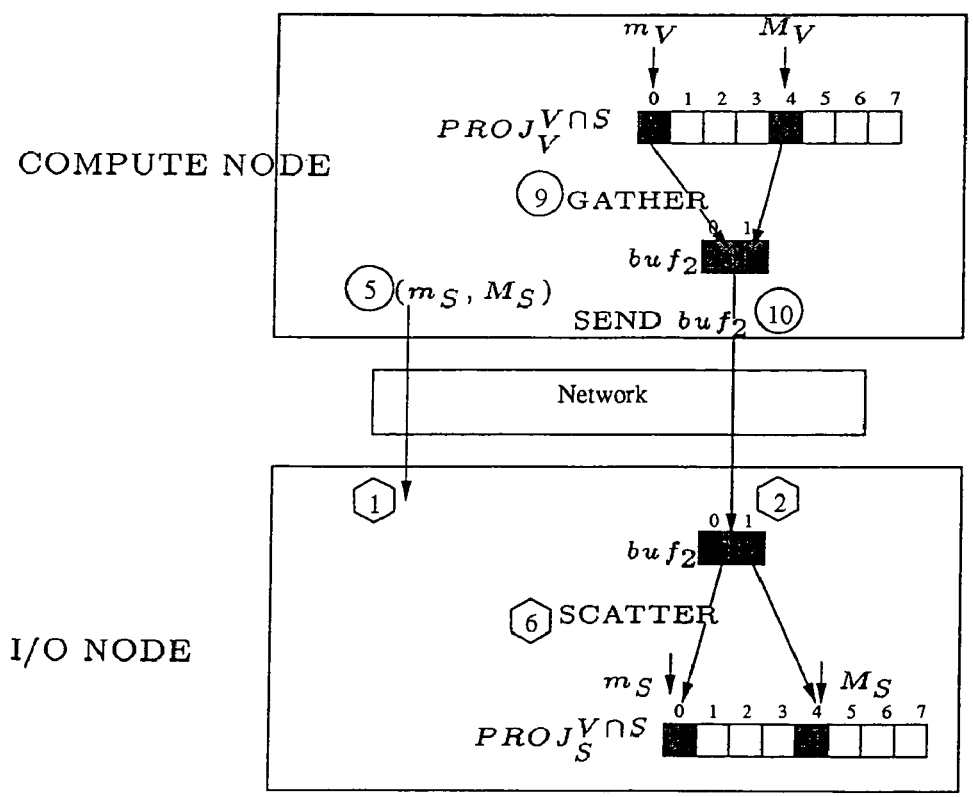

We now show how the mapping functions and the intersection algorithm are used in the data operations of the preferred embodiment. Because the write and read are reverse symmetrical, we will present only the write operation. We will accompany our description by an example shown in FIG. 14, for the view and subfile presented in FIG. 13.

Suppose we are given a set on nested FALLS S, a left and a right limit, l and r, respectively. We have implemented two procedures for copying data between the non-contiguous regions defined by S and a contiguous buffer buf (or a subfile):

GATHER (dest, src, m, M, S) copies the non-contiguous data, as defined by S between m and M, from src buffer to a contiguous buffer (or to a subfile) dest. For instance, in FIG. 14(b), the compute node gathers the data between m=0 and M=4 from a view to the buffer buf$_2$, using the set of FALLS $\{(0, 0, 4, 2, \emptyset)\}$.

SCATTER (dest, src, m, M, S) distributes the data from the contiguous buffer (or subfile) src, non-contiguously, as defined by S between m and M on the the buffer dest. For instance, in FIG. 14(b), the I/O node scatters the data from $buf_2$, to a subfile, between m=0 and M=4, using the set of FALLS $\{(0, 0, 4, 2, \emptyset)\}$.

The implementation consists of the recursive traversal of the set of trees representation of the nested FALLS from S. Copying operations take place at the leafs of the tree.

When a compute node opens an existing file, it receives from the metadata manager the displacement displ and the partitioning pattern P.

When a compute node sets a view, described by V, on an open file, with displacement displ and partitioning pattern P, the intersection between V and each of the subfiles is computed (line 2). The projection of the intersection on V is computed (line 3) and stored at compute node. The projection of the intersection on S is computed (line 4) and sent to I/O node of the corresponding subfile (line 5).

```
1:   for all S ∈ P do
2:       V ∩ S ←INTERSECT (V,S)
3:       PROJ_V^{V∩S} ←PROJ_V(V∩S)
4:       PROJ_S^{V∩S} ←PROJ_V(V∩S)
5:       Send PROJ_S^{V∩S} at I/O node of subfile S
6:   end for
```

The example from FIG. 14(b) shows the projections $PROJ_V^{V \cap S}$ and $PROJ_S^{V \cap S}$, for a view and one subfile, as computed in the example above relating to projections.

Suppose that a compute node has opened a file defined by displ and P and has set a view V on it. As previously shown, the compute node stores $PROJ_V^{V \cap S}$, and the I/O node of subfile S stores $PROJ_S^{V \cap S}$, for all S∈P. We will show next the steps involved in writing a contiguous portion of the view, between $m_V$ and $M_V$, from a buffer buf to the file (see also FIG. 14 and the following two pseudocode fragments).

For each subfile described by S (1) and intersecting V (2), the compute node computes the mapping of $m_V$ and $M_V$ on the subfile, $m_S$ and $M_S$, respectively (3 and 4) and then sends them to the I/O server of subfile S (5). Subsequently, if $PROJ_V^{V \cap S}$ is contiguous between $m_V$ and $M_V$, buf is sent directly to the I/O server (7). Otherwise the non-contiguous regions of buf are gathered in the buffer $buf_2$ (9) and sent to the I/O node (10).

```
1:   for all S ∈ P do
2:       if PROJ_V^{V∩S} ≠ ∅ then
3:           m_S ←MAP_S(MAP_V^{-1} (m_V))
4:           M_S ←MAP_S(MAP_V^{-1} (M_V))
5:           Send (m_S,M_S) of subfile S to the I/O server of S
6:           if PROJ_V^{V∩S} is contiguous between m_V and M_V then
7:               Send M_V− m_V+ 1 bytes between m_v and M_V to I/O server
                 of subfile defined by S
8:           else
9:               GATHER(buf_2, buf, m; M, PROJ_V^{V∩S})
10:              Send buf_2 to to I/O server of subfile defined by S
11:          end if
12:      end if
13:  end for
```

The I/O server receives a write request to a subfile defined by S between $m_S$ and $M_S$ (1) and the data to be written in buffer buf (2). If $PROJ_S^{V \cap S}$ is contiguous, buf is written contiguously to the subfile (4). Otherwise the data is scattered from buf to the file (6).

```
1:   Receive m_S and M_S from compute node
2:   Receive the data in buf
3:   if PROJ_S^{V∩S} is contiguous between m_S and M_S then
4:       Write buf to subfile S between m_S and M_S
5:   else
6:       SCATTER(subfile, buf, m_S, M_S, PROJ_S^{V∩S})
7:   end if
```

We performed our experiments on a cluster of 16 Pentium III 800M, having 256 kB L2 cache and 512 MB RAM, interconnected by Myrinet. Bach machine is equipped with IDE disks. They were all running LINUX kernels. The throughput of the buffered disk reads, as measured by the hdparm utility, is 25.50 MB/sec. The TCP throughput, as measured by the ttcp benchmark, is 82 MB/sec.

Figure 15:
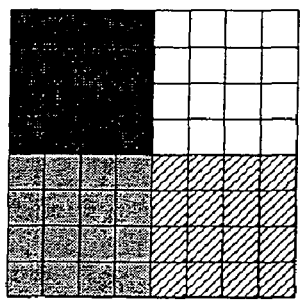
FIG. 15 shows examples of matrix partitioning.
Figure 15:
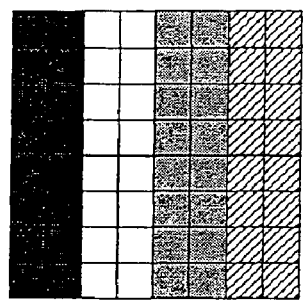
Figure 15:
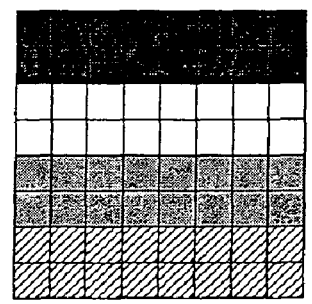

We wrote a benchmark that writes and reads a two dimensional matrix to and from a file in the preferred embodiment. We repeated the experiment for different sizes of the matrix: 256×256, 512×512, 1024×1024, 2048×2048. For each size, we physically partitioned the file into four subfiles in three ways (see FIG. 15): blocks of rows (r), blocks of columns (c) and square blocks (b). Each subfile was written to one I/O node. For each size and each physical partition, we logically partitioned the file among four processors in blocks of rows. All measurements were repeated several times, the smallest and the largest value discarded, and the average computed.

We measured the timings for different phases of write and read operations, when the I/O nodes are writing to their buffer caches, and to their disks, respectively table 1 shows the average results for one compute node, and table 2 the average results for one I/O node.

TABLE 1

Write timing at compute node

| Size | P | L | $t_i$ (μs) | $t_m$ (μs) | $t_g$ (μs) | $t_n^{BC}$ (μs) | $t_n^{disk}$ (μs) |
|---|---|---|---|---|---|---|---|
| 256 × 256 | c | r | 1229 | 9 | 344 | 1205 | 4346 |
|  | b | r | 514 | 4 | 203 | 831 | 2191 |
|  | r | r | 310 | 0 | 0 | 510 | 1455 |
| 512 × 512 | c | r | 1096 | 11 | 940 | 2871 | 7614 |
|  | b | r | 506 | 6 | 568 | 2294 | 5900 |
|  | r | r | 333 | 0 | 0 | 1425 | 4018 |
| 1024 × 1024 | c | r | 1136 | 18 | 2414 | 9237 | 22309 |
|  | b | r | 518 | 9 | 1703 | 7104 | 19375 |
|  | r | r | 318 | 0 | 0 | 5340 | 15136 |
| 2048 × 2048 | c | r | 1222 | 22 | 6501 | 30781 | 80793 |
|  | b | r | 503 | 11 | 5496 | 26184 | 71358 |
|  | r | r | 296 | 0 | 0 | 20333 | 56475 |

In which:
P: physical partitioning
L: logical partitioning
$t_i$: time to intersect the view with the subfiles
$t_m$: time to map the extremities of the write interval on the subfiles
$t_g$: time to gather the non-contiguous data into one buffer
$t_n^{BC}$: the interval between the moment the compute node sends the first request to an I/O node and the the moment the last reply arrives, when writing to the buffer cache of I/O nodes
$t_n^{disk}$: the interval between the moment the compute node sends the first request to an I/O node and the the moment the last reply arrives, when writing on the disks of I/O nodes

TABLE 2

Write timing at I/O node

| Size | P | L | C | $t_n$ (μs) | $t_s^{BC}$ (μs) | $t_s^{disk}$ (μs) |
|---|---|---|---|---|---|---|
| 256 × 256 | c | r | 4 | 345 | 87 | 2255 |
|  | b | r | 2 | 311 | 61 | 1278 |
|  | r | r | 1 | 361 | 45 | 918 |

TABLE 2-continued

Write timing at I/O node

| Size | P | L | C | $t_n$ (µs) | $t_s^{BC}$ (µs) | $t_s^{disk}$ (µs) |
|---|---|---|---|---|---|---|
| 512 × 512 | c | r | 4 | 883 | 292 | 3593 |
|  | b | r | 2 | 1066 | 261 | 3095 |
|  | r | r | 1 | 1118 | 219 | 2717 |
| 1024 × 1024 | c | r | 4 | 3904 | 1096 | 10602 |
|  | b | r | 2 | 4023 | 1068 | 10622 |
|  | r | r | 1 | 3886 | 1194 | 10951 |
| 2048 × 2048 | c | r | 4 | 15495 | 4942 | 41684 |
|  | b | r | 2 | 15555 | 4919 | 41178 |
|  | r | r | 1 | 15049 | 5081 | 41179 |

In which:
P: physical partitioning
L: logical partitioning
C: I/O node contention, the average number of compute nodes, which sent requests to one I/O node
$t_i$: time to intersect the view with the subfiles
$t_m$: time to map the extremities of the write interval on the subfiles
$t_n$: the average time of network operations of an I/O node
$t_s^{BC}$: the scatter average time of an I/O node, when writing to the buffer cache
$t_s^{disk}$: the scatter average time of an I/O node, when writing on the disks We show only the write timings, because the read results were significantly close. Based on that, we make the following observations:

Given a physical and a logical partitioning, the time to perform the intersection and to compute the projections doesn't vary significantly with the matrix size. As expected, $t_i$ is small for the same partitions, and larger when the partitions don't match. It is worth noting that $t_i$ has to be paid only at view setting and can be amortized over several accesses.

The time to map the access interval extremities of the view on the subfile $t_m$ is very small.

The gather time $t_g$ varies with the size of the matrix and with the matching degree of physical and logical partitioning. It is 0 for an optimal matching, for all sizes. For a given matrix size, $t_g$ is largest when the partitions match poorly, because repartitioning results in many small pieces of data which are assembled in a buffer.

For a given size, the times $t_n^{BC}$ and $t_n^{disk}$ contain the sum of network and I/O servers activity, as measured at the compute node. Their value are limited by the slowest I/O server.

The performance is influenced by the I/O node contention, the average number of compute nodes which contact one I/O node. The contention is large for patterns that match poorly, and therefore hinders the parallelism of compute nodes, and implicitly the scalability. For instance, redistributing data between row of blocks and row of columns results in each of the four computing nodes contacting all four I/O servers (see the fourth column of table 2). For an optimal match, the contention is one, therefore the requests of each compute node are sent to different I/O nodes.

The scatter times $t_s^{BC}$ and $t_s^{disk}$ contain the times to write a non-contiguous buffer to buffer cache, and to disk, respectively. We didn't optimize the contiguous write case to write directly from the network card to buffer cache. Therefore, we perform an additional copy. Consequently, the figures for all three different pairs of distributions are close for big messages. However, for small sizes (256 and 512), the write performance to buffer cache and especially to disk is the best for an optimal match of distributions.

Table 3 shows the average throughput of one client. The fifth and seventh columns show a significant performance improvement for optimal over poorer matching patterns, for the same matrix size, ranging between 111% and 295% for writing to the buffer cache and 111% and 322% for writing on the disk.

TABLE 3

Average compute node throughput

| Size | P | L | $Thru_{BC}$ (MB/s) | $g_{BC}$ (%) | $Thru_d$ (MB/s) | $g_d$ (%) |
|---|---|---|---|---|---|---|
| 256 × 256 | c | r | 10.34 | — | 3.45 | — |
|  | b | r | 15.09 | 145 | 6.61 | 191 |
|  | r | r | 30.54 | 295 | 11.12 | 322 |
| 512 × 512 | c | r | 16.97 | — | 7.60 | — |
|  | b | r | 22.56 | 132 | 10.05 | 132 |
|  | r | r | 44.56 | 262 | 16.23 | 213 |
| 1024 × 1024 | c | r | 22.37 | — | 10.60 | — |
|  | b | r | 29.65 | 132 | 12.39 | 116 |
|  | r | r | 48.89 | 218 | 17.29 | 163 |
| 2048 × 2048 | c | r | 28.08 | — | 12.01 | — |
|  | b | r | 33.01 | 117 | 13.62 | 113 |
|  | r | r | 51.50 | 183 | 18.55 | 154 |

In which:
P: physical partitioning
L: logical partitioning
$Thru_{BC}$: average throughput of a compute node, when I/O nodes are writing to the buffer cache
$g_{BC}$: throughput gain over the row-block physical partitioning, when I/O nodes are writing to the buffer cache
$Thru_{disk}$: average throughput of a compute node, when I/O nodes write on the disk
$g_{disk}$: throughput gain over the row-block physical partitioning, when I/O nodes write on the disk The experimental results have shown that the performance of parallel application is optimal when the physical and logical partitions match.

The present invention has been described, showing a parallel file system which offers a high degree of control of the file layout over the cluster. It also allows application to set arbitrary views on the files. Our parallel file system offers a compact way of expressing regular access patterns and file layouts, as for instance n-dimensional array distributions. It also allows a convenient conversion between layouts. In the experimental section of this paper we have showed how the match between access patterns and file layout can impact performance in the present invention. We have found out that the parallel applications may improve their I/O performance, by using a file layout that adequately matches their access pattern. This translates in a better usage of the parallelism of I/O servers and of the disk and network bandwidth. Therefore, the common internal data representation of physical and logical partitions, as well as the flexible physical layout of the present invention may contribute to a more global efficient usage of the I/O subsystem.

Two mechanisms have been presented for the implementation of data operations in a parallel file system: mapping functions and data redistribution. The preferred embodiment uses a common data representation for both physical and logical partitions of a file. All entities of a partition (subfile or view) may be linearly addressable. Mapping functions are used for computing the mapping between two such linear spaces. The data redistribution algorithm computes the set of indices necessary for converting between two arbitrary distributions. These sets are computed only once, at view setting, and are amortized over several accesses. Subsequently, they are used in data scattering and gathering during the communication between compute nodes and I/O nodes.

Although various minor changes and modifications might be proposed by those skilled in the art, it will be understood that the appended claims are intended to encompass all such changes and modifications which will reasonably fall within the invention's contribution to the field of distributed file systems.

The invention claimed is:

1. A distributed file system comprising:
a plurality of compute nodes; and
a plurality of input/output (I/O) nodes, the I/O nodes and the compute nodes being connected by an interconnection network;
wherein the distributed file system includes a common data representation for physical and logical partitions of a file stored in the system, and elements of the physical and logical partitions are linearly addressable, so that each compute node is programmed to perform a plurality of file operations, including:
computing a mapping between a linear space of a file and a linear space of a subfile;
computing mappings between a linear space of a view and linear spaces of subfiles;
performing an intersection algorithm between the view and the subfile; and
performing a data operation;
wherein a Processor Index Tagged FAmiLy of Line Segments (PITFALLS) is used for data representation representing a set of equally spaced FAmiLy of Line Segments (FALLS) forming outer FALLS, wherein each outer FALLS contains a set of inner PITFALLS forming nested PITFALLS for representing a physical partitioning of a file onto I/O nodes, a logical partitioning of a file onto compute nodes and mappings between them, so as to allow for arbitrarily partitioning data on available storage media and among several compute nodes, respectively.

2. The distributed file system of claim 1, wherein the system includes a metadata manager to gather information about a file from the plurality of I/O nodes and to maintain the I/O nodes in a consistent state.

3. The distributed file system of claim 2, wherein each I/O node includes an I/O server to perform the tasks of writing data to and reading data from subfiles stored on its respective I/O node.

4. The distributed file system of claim 2, wherein an I/O server is for maintaining metadata about each of the subfiles stored at said I/O node and for delivering the metadata to the metadata manager upon request.

5. The distributed file system of claim 2, wherein the compute nodes are for contacting the metadata manager for any file operation that involves system metadata.

6. A method of operating a distributed file system including a plurality of input/output (I/O) nodes and a plurality of compute nodes, the method comprising:
(i) physically partitioning a file into subfiles;
(ii) logically partitioning a file into views;
(iii) performing mapping functions between subfiles and views; and
(iv) performing data redistribution between partitions;
wherein a Processor Index Tagged FAmiLy of Line Segments (PITFALLS) is used for data representation representing a set of equally spaced FAmiLy of Line Segments (FALLS) forming outer FALLS, wherein each outer FALLS contains a set of inner PITFALLS forming nested PITFALLS for representing a physical partitioning of a file onto I/O nodes, a logical partitioning of a file onto compute nodes and mappings between them, so as to allow for arbitrarily partitioning data on available storage media and among several compute nodes, respectively.

7. The method of claim 6, wherein the redistribution is performed between: (a) two physical partitions; (b) two logical partitions; and (c) a logical and a physical partition.

8. The method of claim 6, further comprising:
performing a plurality of algorithms, including:
(a) an algorithm to compute a mapping of a file offset from a linear space of a file on a linear space of a subfile;
(b) an algorithm to compute a mapping from a linear space of a subfile to a file;
(c) an algorithm to compute a mapping between a subfile and a view;
(d) an algorithm to compute an intersection of sets of nested FALLS; and
(e) an algorithm to compute a projection of a set of FALLS on a linear space described by another set of FALLS.

9. The method of claim 6, wherein the method includes:
(a) computing the mappings between the logical and physical partitioning of the file at a view setting; and
(b) using the mappings at read/write operations for gathering or scattering the data into or from messages, so that an overhead of computing access indices is paid just once at the view setting.

* * * * *